United States Patent [19]

Sanders, Jr. et al.

[11] Patent Number: 5,506,607
[45] Date of Patent: Apr. 9, 1996

[54] 3-D MODEL MAKER

[75] Inventors: Royden C. Sanders, Jr., Wilton; John L. Forsyth, So. Lyndeborough; Kempton F. Philbrook, Lyndeborough, all of N.H.

[73] Assignee: Sanders Prototypes Inc., Wilton, N.H.

[21] Appl. No.: 378,947

[22] Filed: Jan. 26, 1995

Related U.S. Application Data

[63] Continuation of Ser. No. 112,437, Aug. 26, 1993, which is a continuation-in-part of Ser. No. 87,705, Jul. 9, 1993, which is a continuation-in-part of Ser. No. 646,153, Jan. 25, 1991.

[51] Int. Cl.$^6$ .................................................. B41J 2/01
[52] U.S. Cl. .................. 347/1; 118/695; 156/58; 264/460; 264/122; 425/375; 427/466; 364/468; 347/37
[58] Field of Search ............ 347/1, 37, 6; 118/695; 156/58; 264/24; 425/375; 427/466

[56] References Cited

U.S. PATENT DOCUMENTS

| | | | |
|---|---|---|---|
| 3,222,776 | 12/1965 | Kawecki | 29/503 |
| 3,892,506 | 7/1975 | Dann | 425/78 |
| 3,968,498 | 7/1976 | Uchiyama | 347/2 |
| 4,247,508 | 1/1981 | Householder | 264/219 |
| 4,486,761 | 12/1984 | Tarnowski | 346/161 |
| 4,575,330 | 3/1986 | Hull | 425/174.4 |
| 4,621,273 | 11/1986 | Anderson | 347/40 X |
| 4,665,492 | 5/1987 | Masters | 364/468 |
| 4,737,858 | 4/1988 | DeBaryshe | 358/296 |
| 4,920,422 | 4/1990 | Lapierre | 347/2 X |
| 5,014,207 | 5/1991 | Lawton | 364/468 |
| 5,059,266 | 10/1991 | Yamane | 347/1 X |
| 5,126,754 | 6/1992 | Spinar | 347/6 |
| 5,132,248 | 7/1992 | Drummond | 347/1 X |
| 5,136,515 | 8/1992 | Helinski | 364/468 |
| 5,143,817 | 9/1992 | Lawton et al. | 430/269 |
| 5,151,813 | 9/1992 | Yamamoto | 359/202 |
| 5,204,055 | 4/1993 | Sachs | 419/2 |
| 5,260,009 | 11/1993 | Penn | 347/1 X |
| 5,303,141 | 4/1994 | Batchelder | 364/149 |

*Primary Examiner*—Joseph W. Hartary
*Attorney, Agent, or Firm*—Davis, Bujold & Streck

[57] ABSTRACT

The 3-D Model Maker of the present invention is a device that builds three dimensional models of computer generated (e.g., CAD) structures by vector plotting layer-upon-layer applications of solidifiable substances. The layers are formed by expelling minuscule beads of the substances in liquid or flowable phase onto a platform from one or more jets, the jets and platform being relatively movable in X, Y and Z coordinate system. The beads are deposited along vectors, during X/Y relative movement, on the stage, one at a time, layer-upon-layer, to build the model. The jets and platform are moved relatively to one another in accordance with instructions from the computer (controller) to form each layer in the X-Y plane (in a manner analogous to an X-Y vector plotter) and either the stage or the jets may move in the Z direction to allow the jets to form subsequent layers.

44 Claims, 7 Drawing Sheets

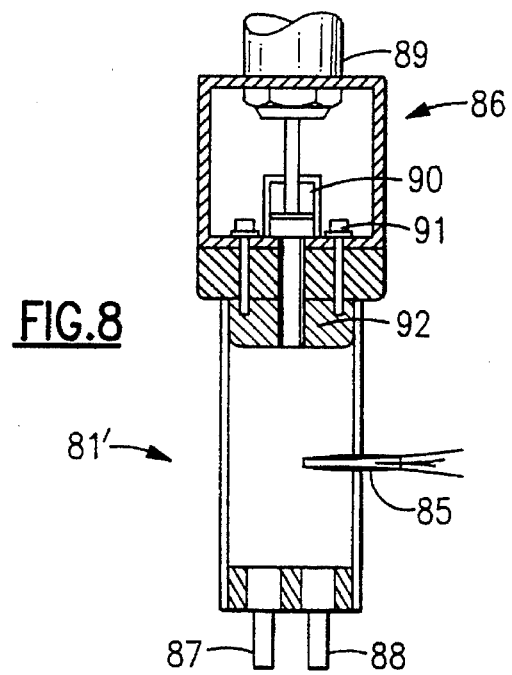
FIG.8
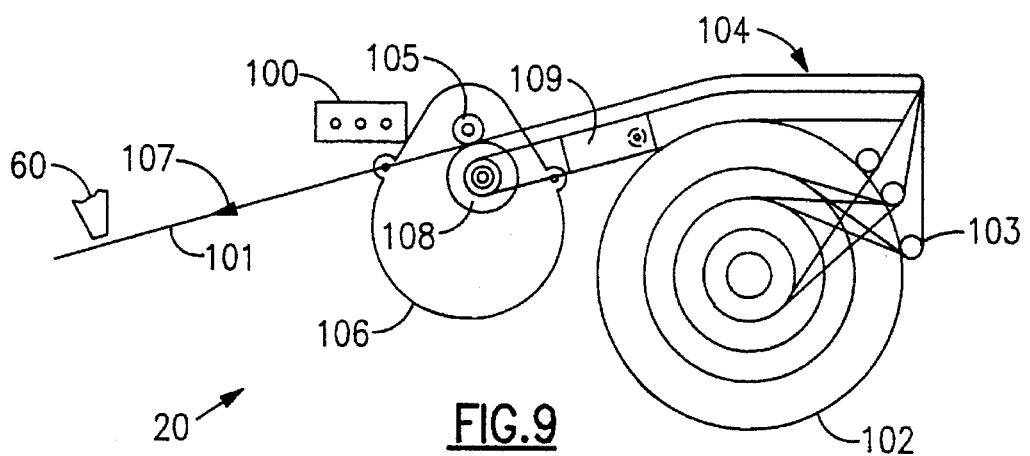
FIG.9
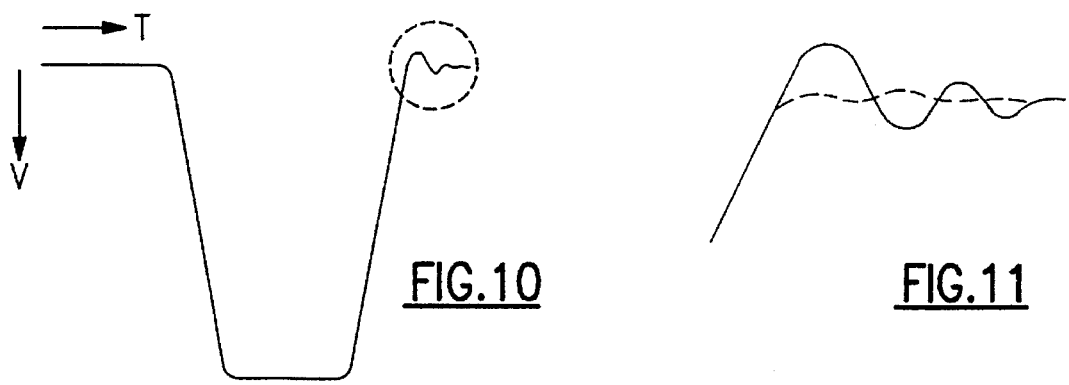
FIG.10
FIG.11

3-D MODEL MAKER

This application is a continuation of U.S. patent application Ser. No. 08/112,437, filed Aug. 26, 1993, which is a continuation-in-part application of U.S. Ser. No. 08/087,705 filed Jul. 9, 1993 which is a continuation-in-part application, by way of PCT/US92/00587 filed Jan. 24, 1992, of U.S. patent application Ser. No. 07/646,153 filed Jan. 25, 1991.

This invention relates to a 3-D model maker utilizing drop on demand jet and vector plotting technology.

BACKGROUND OF THE INVENTION

3-D model making at the present time is exemplified by Penn U.S. Pat. No. 5,260,009. Penn discloses a system and process for making 3-dimensional objects by dispensing layer upon layer of modelling material using an inkjet which is turned on or off according to a 2-dimensional data map of each layer of the object. The 2-D data map is stored and relayed by a microprocessor and defines locations on a matrix at which printing is to occur in a manner such as is used in printing images using raster scan printing.

It is an object of the present invention to provide a 3-D model maker which provides a significant improvement, relative to previous proposals, with respect to the achievement of desired dimensional accuracy, quality of surface finish, on all surfaces, combined with the ability to manufacture the complex shapes specified by today's requirements.

It is a further object of the present invention to provide such an apparatus which is reliable, not unduly complex and relatively rapid in its rate of model building.

It is a yet further object of the present invention to provide such an apparatus with systems and subsystems, methods and processes facilitating efficient and effective operation in the making of 3-D models.

SUMMARY OF THE INVENTION

The 3-D Model Maker of the present invention is a device that builds three dimensional models of computer generated (e.g., CAD) structures by vector plotting layer-upon-layer applications of solidifiable substances. The layers are formed by expelling minuscule beads of the substances in liquid phase onto a platform from one or more jets, the jets and platform being relatively movable in X, Y and Z coordinate system. Preferably X and Y coordinates are horizontal and Z coordinate is vertical. However, other orientations are possible and practical. The beads are deposited along vectors, during X/Y relative movement, on the stage, one at a time, layer-upon-layer, to build the model. The jets and platform are moved relatively to one another in accordance with instructions from the computer (controller) to form each layer in the X-Y plane (in a manner analogous to an X-Y vector plotter) and either the stage or the jets may move in the Z direction to allow the jets to form subsequent layers.

In one embodiment of the Model Maker, there are two jets: one for a first substance that will form the smooth exterior surfaces of the model and provide a bulk filler for the solid interiors of the model, and one for a removable other substance that forms the supports for otherwise unsupported portions of the model (e.g., the cross member of an H-shaped model). The first substance and the bulk filler may, in another embodiment be emitted from separate jets of a three jet system. The Model maker preferably includes a shaver for smoothing the deposited layers in the X-Y plane so that the Z direction build is even. Warpage of the model may be controlled by depositing the beads spaced from one another and backfilling after the deposited beads have solidified.

The heating and composition of the beads is chosen not only to provide structural integrity of the model but also so that they solidify quickly, almost upon contact with the platform or other substances, so that additional layers may be added without delay and so that shrinkage can be controlled or substantially eliminated.

In a different embodiment, still utilizing the broad concept, the bead forming drops are used to bond particles, previously laid down, to themselves and to the next previous layer to build the model layer by layer.

According to the invention there is provided a 3-D model maker for producing a 3-D model by sequentially forming layer upon layer, by plotting vectors of modeling material, one layer at a time comprising a) a support means defining a surface for supporting the 3-D model during production; b) a drop on demand jet means for ejecting bead producing drops of the modeling material one drop at a time upon demand to form vectors defining the layers; c) mounting means mounting the jet for simultaneous movement, in at least two of an X, Y, Z coordinate system to define the vectors of modeling material and for movement when desired in all three X, Y, Z coordinates of the system, relative to the surface; and d) control means to control the movements in the X, Y, Z coordinate system and the ejection of bead producing drops by the jet to generate the vectors, defined by the beads, in all directions required to produce the model.

BRIEF DESCRIPTION OF THE DRAWINGS

The invention will now be described in the following detailed description, by way of example, with reference to accompanying drawings, in which:

FIG. 8 is a cross-sectional elevation of a feed reservoir for a jet of the present invention;

FIG. 9 is a diagrammatic illustration of a side elevation of a jet checking and cleaning station;

FIGS. 10 and 11 illustrate an electrical pulse used to operate a jet, illustrating the wave form which is the signature of an operating jet and a non-conforming wave form indicating failing of a jet;

DETAILED DESCRIPTION OF THE INVENTION

The Model Maker Apparatus

Figure 1:
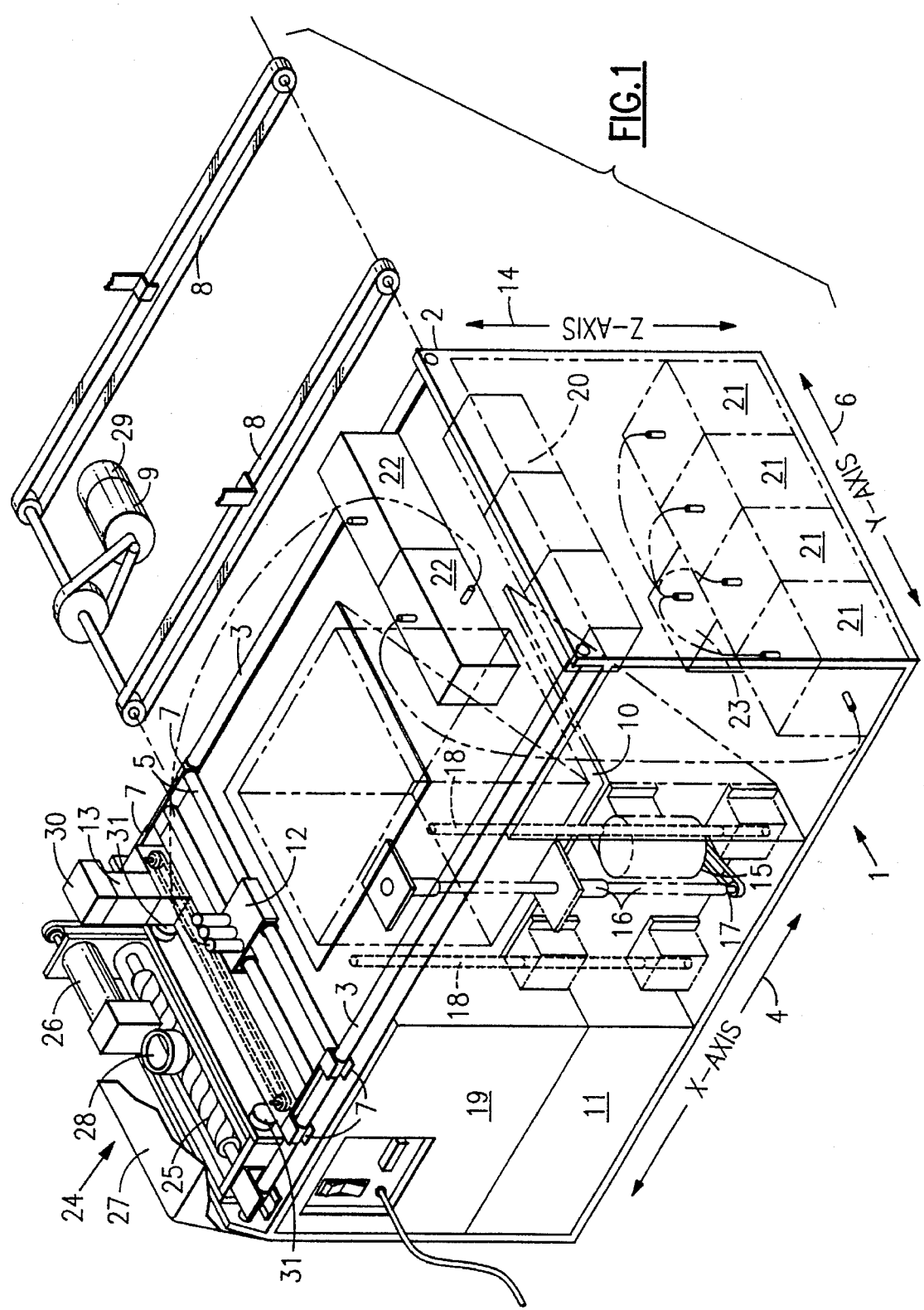
FIG. 1 is a diagrammatic isometric view of a three jet, 3-D Model Maker according to the present invention.

Referring firstly to FIG. 1, the 3-D Model Maker 1 of the present invention comprises a frame 2 which supports a horizontal pair of spaced apart rails 3 extending in an X-coordinate direction (axis) 4 of the Model Maker. The rails 3 support a further pair of horizontal spaced apart rails 5 which extend in a Y-coordinate direction (axis) 6. The Y coordinate rails 5 are supported at their ends in bearings 7 on the X-coordinate rails 3 to permit the Y-coordinate rails 5 to slide along the X coordinate rails 3 in the X-coordinate direction. Motion of the Y-coordinate rails along the X-coordinate rails is achieved by the use of a belt drive 8 (shown displaced from the apparatus for clarity) powered by a motor 9 which includes an optical encoder 29 to ascertain and determine the position of the Y-coordinate rails relative to a platform 10 (shown carrying a cubic model) along the X-coordinate under the control of a system logic controller 11.

The Y-coordinate rails 5 support a carriage 12 for sliding movement therealong under the control of a belt driven motor system 13 with optical encoder 30 similar to that described above with respect to motion of the Y-coordinate rails. This system 13 is also controlled by the system logic controller 11 to ascertain and determine the position of the carriage relative to the platform 10, but in this case, in the Y-coordinate direction.

The carriage 12 carries three jets 60, one of which is for ejecting drops of wall producing material (modeling compound-MC), a second of which is for ejecting of drops of a bulk fill material (also MC) and a third of which is for ejecting beads of a support material (SM). These materials are hereinafter described in greater detail.

The platform 10 can be raised and lowered relative to the carriage 12 in the Z-coordinate direction (axis) 14 by means of a stepper motor 15 which drives a screw and nut jack 16, the nut of which is attached to the platform 10 to raise or lower the platform upon rotation of the screw by a belt drive 17 from the stepper motor 15. The platform 10 is guided by bearings on guide posts 18 which extend in the Z-coordinate direction. The guide posts 18 are supported rigidly by the frame 2.

The system logic controller 11 determines the position of the platform relative to the jets 60 in the Z-coordinate direction and the timing of ejection of the bead producing drops of material from the jets 60 using software instructions not unlike those utilized in vector plotters to control the motion of the vector plotter pens in the production of the drawing as will be well understood by those skilled in the art.

The frame 2 supports a power supply 19 which provides the power for the various systems and motors of the model maker in accordance with their individual requirements and the commands issued by the system logic controller 11. Adjacent one end of the X-coordinate rails 3 is a jet checking and cleaning station 20 which will be described in greater detail hereinafter. At that same end of the X-coordinate rails the frame 2 supports heated supply reservoirs 21 which store MC, bulk MC and SC, as required, for supply to the jets 60, by way of feed reservoirs 22. A pressure pump 23 is supported by the frame 2 to pressurize the supply reservoirs 21 when the media carried therein is required to be transported to the feed reservoirs 22.

The X-coordinate rails 3 also support a model shaving system 24 the use of which will be described in detail hereinafter. The model shaving system 24 comprises a slab milling cutter 25 which is belt driven by a motor 26 and includes a housing 27 for connection to a vacuum line by way of an outlet 28 to facilitate removal of shavings produced by the model shaving system. The model shaving system includes electromagnets 31 for engaging the carriage 12 and Y coordinate rails 5 for moving the milling cutter along the X-coordinate rails. The milling cutter 25 defines an axis extending in the Y-coordinate direction and has a length at least as great as the dimension of the platform 10 in the Y-coordinate direction.

It will be appreciated that a plurality of jet groups could readily be accommodated on a single carriage, with means for adjusting their spacing if required, associated with a common X, Y and Z drive arrangement, shaving system, controller, power supply etc. in a single model maker, to permit the simultaneous modeling of a plurality of like models.

It will be appreciated that while model maker 1 described with reference to FIG. 1 provides vector movement of the jets 60 in the X-Y coordinate direction and movement of the platform 10 in the Z coordinate direction, other arrangements would be apparent to those skilled in the art. In fact, the X, Y, Z coordinate movements may be provided by moving either the jets 60 alone or the platform 10 alone or by any combination of movements of the jets and platform resulting in the desired coordinate movements. Furthermore, although the Z coordinate direction is preferably vertical, those skilled in the art will appreciate that other orientations for the Z coordinate direction (axis) are possible.

It will be appreciated that while the system logic controller has been described in a manner suggesting it to be a single unit, a plurality of separate control units interacting as needed could together form the system logic controller.

Jet Structure

Figure 3:
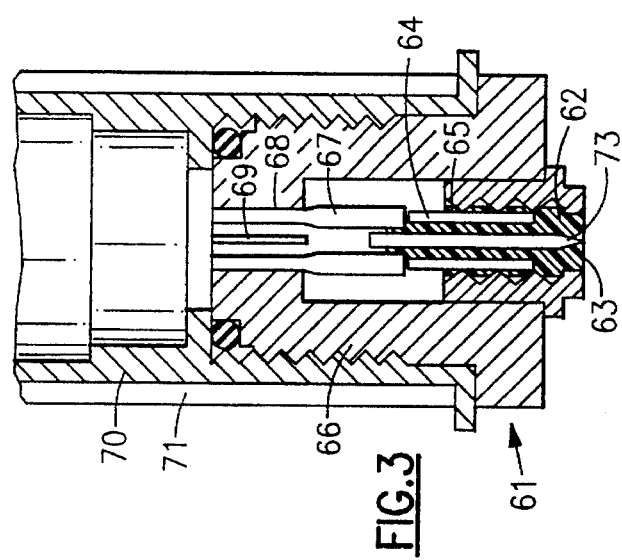
FIG. 3 is an enlarged view of circled portion A of FIG. 2.
Figure 2:
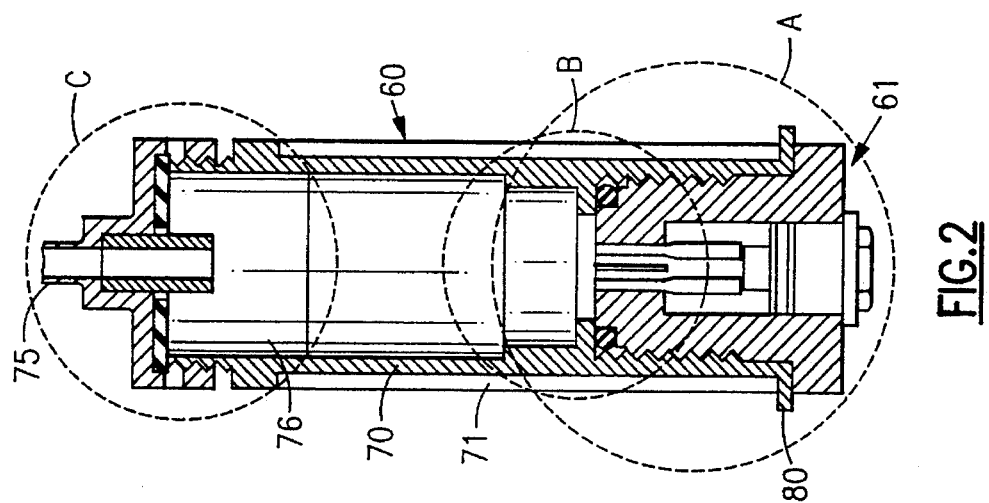
FIG. 2 is a cross-sectional elevation of a jet for use in the present invention.

As shown in FIGS. 2 and 3, the jet tip assembly consists of a small jet tube 62 molded of a flouropolymer and configured internally with a cone in one end 63. During molding the cone is formed closed and is later opened forming an orifice 73 with the desired diameter by slicing off the cone end 63 of the tube. The other end of the tube is open and receives the molten fluid from the supply system which will be discussed hereinafter.

Surrounding the tube is another tube 64 made of a piezoelectric material. This piezo tube 64 is plated to provide electrical connections (i.e. as with a capacitor) to pole the piezo. The piezo tube 64 is surrounded with an electrical potting grade of epoxy 65 to absorb thermal shock. The assembly is then mounted in a threaded aluminum insert 66.

The jet tip assembly 61 further consists of a connect tube 65 formed of a short length of elastomeric tubing which attaches to the open end of the jet tube. The connect tube 67 is pushed through a hole 68 in one end of the insert 66 and then pulled through to the other end. The jet tip assembly 61 is then attached to the connect tube 67 and the connect tube 67 is pulled back to where the jet tip assembly 61 just touches the opening of the insert. The jet tip assembly 61 is then seated into the threaded aluminum insert 66. As the jet tip 61 is being seated, the connect tube 67 is pulled from the other end so that it will not become kinked. After the jet tip assembly 61 is fully seated, the excess tubing is trimmed flush to the back surface of the threaded aluminum insert 66.

At this point a small tubular insert 69 (seal tube) is placed in the end of the elastomeric tube.

The small seal tube 69 provides two fundamental functions. First, the seal tube 69 is 0.4 mm larger than the I.D. of the elastomeric connect tube 67. This causes the O.D. of the connect tube 67 to seal the I.D. of the insert 66. Secondly, the small I.D. of the seal tube 69 restricts the pressure head of fluid above by taking advantage of capillary forces and allows the jet head 60 to remain idle for long periods without dripping. The seal tube 69 also counterbalances the head pressure from the volume of fluid above and allows vertical jetting without dripping.

Figure 4:
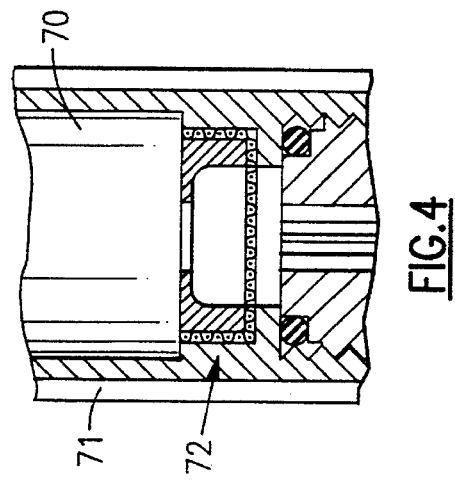
FIG. 4; is an enlarged view of circled portion B of FIG. 2.

Everything that has been assembled up to this point is then placed in a tubular jet reservoir 70. This tubular jet reservoir 70 has a heater 71 and a filter 72 (FIG. 4).

Modeling compound (MC) is delivered from a heated reservoir 81, through a heated supply line 75 (FIG. 5) to the jet reservoir 70. The MC supply is maintained and the line remains primed to the jet head through natural siphoning action. Absolute priming of the delivery system through to the orifice is of utmost importance.

Figure 5:
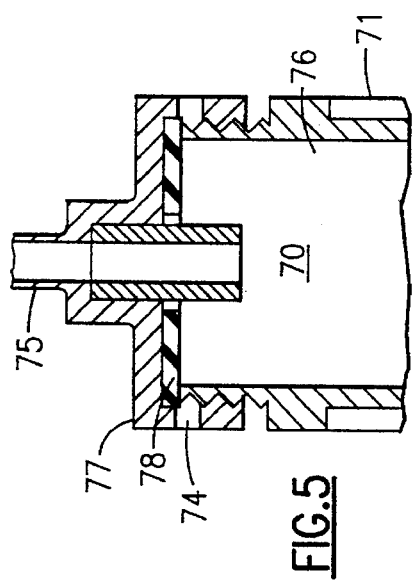
FIG. 5 is an enlarged view of circled portion C of FIG. 2.

A small air pocket 76 is maintained inside the jet reservoir above the surface of the MC (FIGS. 2 and 5). This "bubble" 76 serves a critical function as an isolator from the hydraulic surges that occur as the jet head reciprocates during jetting. In this way the "bubble" 76 prevents the hydraulic surges resulting from motion of the jet head and the heated supply lines from interfering with the meniscus and the forming of drops.

As jetting continues and the MC level in the jet reservoir drops enlarging the bubble, a small vacuum is produced in the jet reservoir. Since the supply line 75 is in a siphon balance, the small increase in vacuum transfers MC from the heated reservoir to the jet reservoir 70 via the supply line.

Upon powering the system, the jet tube 62 is held at voltage with the piezo tube 64 poled. When the drop eject signal is received the voltage drops and the piezo tube 64 is depoled. Depoling causes the piezo tube 64 to apply a constrictive force to the jet tub 62 and sends an energy wave through the fluid residing in the jet tube 62. The internal volume of the jet tube 62 is also reduced somewhat. The acoustic energy wave and the volumetric constriction together tend to force the fluid in two directions, back toward the feed line and forward toward the orifice. Since the feed line 75 is filled with fluid, the path of least resistance is toward the orifice 73. Also, the fluid in the feed line acts as a barrier and acoustically reflects some portion of the acoustic wave energy. Provided the total energy level is sufficient to overcome the meniscus and resistive forces in the orifice 73, a small drop of MC will be jettisoned.

The tubular jet reservoir body 70 is sized specifically to provide approximately 15 minutes of operation (with the feed line detached) in an effort to keep the size and weight of the jet head 60 and carriage system down to a minimum. The tubular jet reservoir 70 is also the main piece to which the other parts are assembled. Within the reservoir is a recess for the wire cloth filter 72, as shown in FIG. 4. When assembled the filter resides just above the jet tip assembly 61 at the bottom of the jet reservoir 70.

A vented cap 77 is located on the top of the jet reservoir providing the connective link between the jet reservoir 70 and the material delivery system. The inside of the cap has an elastomeric seal 78 which insures air tightness within the system. In the sides of the cap, located precisely at the edge of the elastomeric seal, are vent holes 74 which vent directly to the outside atmosphere. These holes are critical in that they provide a method of venting the reservoir with minimum disruption of the inside chamber pressure in the bubble 76 (negatively or positively). When the cap 77 is loosened it immediately breaks the seal allowing air to enter the bubble 76 in the jet reservoir 70 through vent holes 74, and when the cap 77 is tightened it does not adversely increase the reservoir pressure by allowing air to exit the jet reservoir 70 through vent holes 74. This is significant in that the fluid level inside the reservoir remains relatively unchanged. If the vent holes were not there, then when the cover was loosened the unscrewing action would effectively increase the inside volume of the bubble 76 thereby creating a vacuum. This vacuum would suck an air bubble in through the orifice and have the result of stalling the jet when jetting is resumed. Likewise, if the vent holes were not there, the action of screwing the cap on would increase the chamber pressure and force material out the orifice. Without the vents the reservoir would shortly be depleted of material after only a relatively small number of cap removals and replacements.

The insert 66 allows a desired modular approach to the jet head assembly. As earlier described, the insert contains the jet tube 62, the flow restricting seal tube 69, and the elastomeric connecting tube 67. If maintenance is required, this insert is easily removed and access to the rest of the jet head is made available.

The heater 71 is the feed source of heat for the jet head 60. Secondary heat is derived from the molten material delivered to the jet head reservoir 70. The heater 71 is of the foil type and is adhesively applied directly to the external surface of the jet reservoir 70.

The tip of a thermocouple (not shown) makes direct contact with the aluminum tubular jet reservoir 70. The output from the thermocouple is linked to a thermal control device which controls the temperature of the jet head 60 to +/− 2 degrees celsius.

The jet head is clamped to the carriage by a mounting clamp that clamps the lower flange 80 of the reservoir in position on the carriage.

The jet head structure disclosed above is capable of operating under control at 6,000 Htz maximum refire rate. The same size bead of MC is consistently emitted from the jet at the maximum refire rate of 6,000 Htz. If the refire rate is increased to 12,000 Htz, the jet resonates and emits a bead of MC which is twice as large as the bead emitted at 6,000 Htz. Thus, at 12,000 Htz the jet emits four times the volume of MC than at 6,000 Htz, e.g. 2 times the number of beads that are two times as big, thereby building of the model four times as fast. Thus, at 12,000 Htz the model can be built up four times as fast than at 6,000 Htz, although due to the increased size of the beads of MC being deposited there is a corresponding decrease in the quality of the finish of the model produced. Thus, operating the jethead at a refire rate of 12,000 Htz may advantageously be used to fill interior spaces of the model that do not require a good surface finish or to build quick draft models in a draft mode.

It can be appreciated that the modeler may be built with two heads. One head for emitting modeling material for building of the walls at 6,000 Htz and for quickly filling in voids in the model at 12,000 Htz, and a second head for emitting support material at 6,000 Htz to fill in voids in the model. It can also be appreciated that rather than firing the first head at 12,000 Htz and quickly fill in the void in the model, a third head with a larger orifice 73 in the jet tube 62 may be used to emit larger beads of modeling material and thereby fill in interior spaces quickly without necessitating a refire rate of 12,000 Htz, or to fill in even more quickly at 12,000 Htz.

It will be appreciated that a matrix of jets could be provided for quick filling or cross-hatching with one of these jets also forming the wall building jet 60.

Material/Supply System

Figure 6:
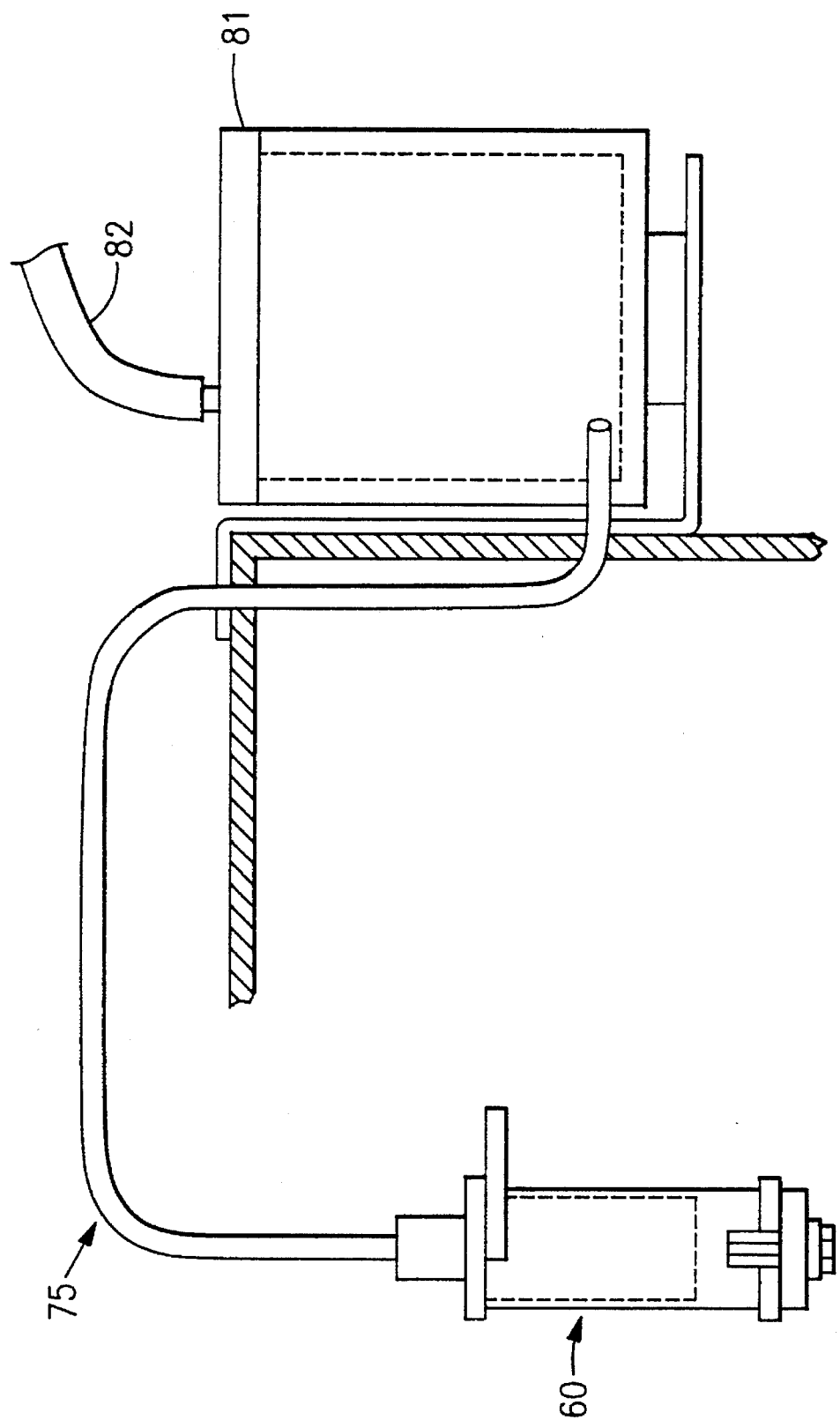
FIG. 6 is a diagrammatic view of a feed system for a jet of the present invention.

According to a first embodiment (FIG. 6) of the material supply system the modeling compound (MC) and the support compound (SC) have been stored in a feed reservoir 81 for each material, only one of which is shown in FIG. 6. These feed reservoirs 81 are mounted on the modeler and are located at critical levels depending on the individual fluid dynamics of the materials.

Each feed reservoir is equipped with an A/C heater (not shown) capable of self regulating temperature control. These heaters can control the MC and SC temperature to within 8 degrees celsius without external temperature controllers.

The feed reservoirs have sealed lids which have a nipple for attaching a viton tube 82. This tube 82 is used to purge the delivery system when it is not attached to the jet head 60 and to purge the jet head when it is attached. Also when a suitable air source is applied, the contamination rate and condition of the filter inside the jet head can be determined.

Figure 7:
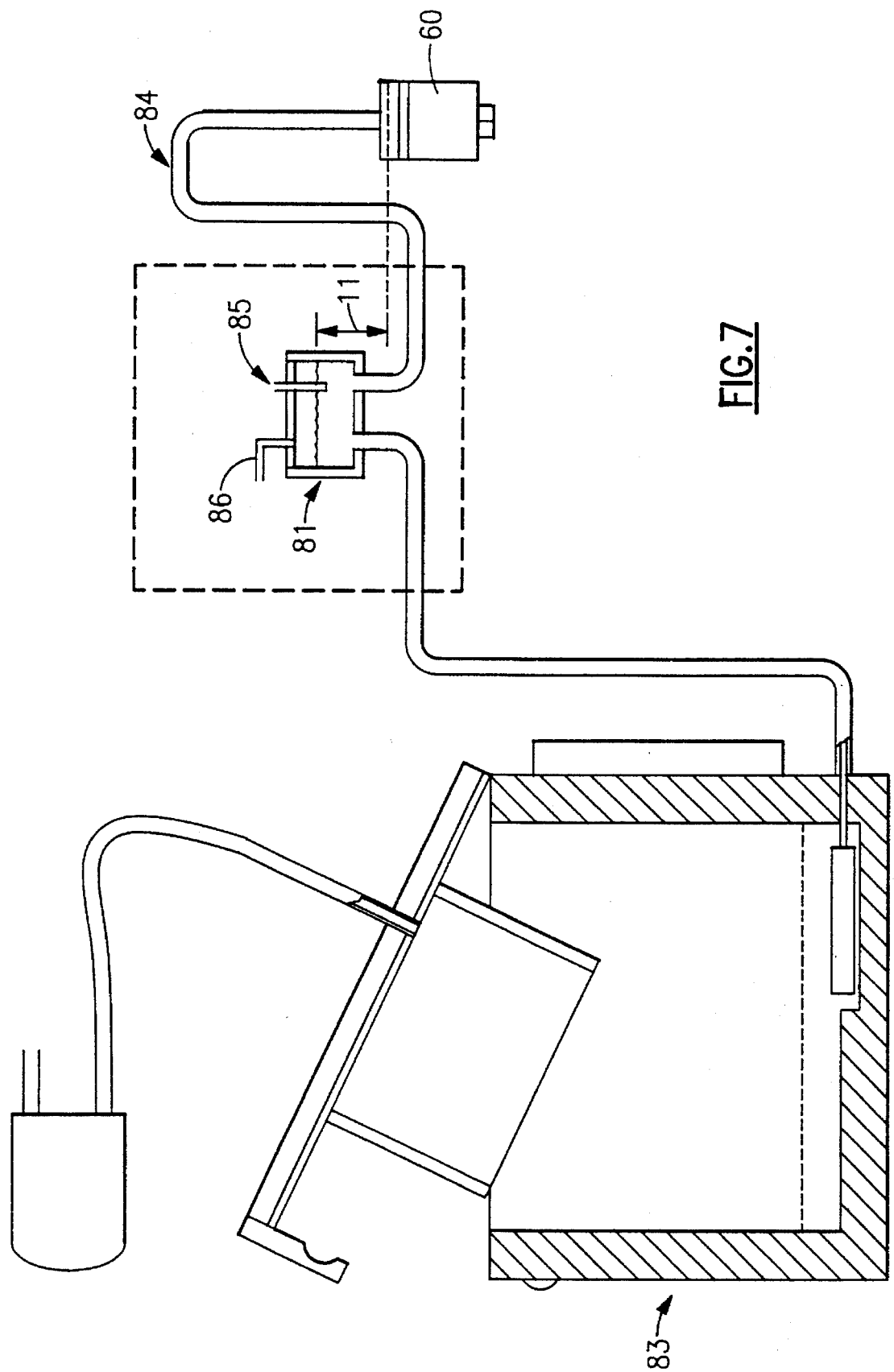
FIG. 7 is a diagrammatic view of a feed arrangement with a main reservoir feeding the feed system of FIG. 6.

FIG. 7 illustrates a second embodiment of the material supply system that has additional general storage reservoirs 83 (only one of which is shown) for storing each of the materials. Additional heated delivery lines 84 connect the general storage reservoirs 83 to the feed reservoirs 81. A level detector 85 is located in the feed reservoir that triggers the transfer of material from the general reservoir 83 to the feed reservoir 81 when the detected level is low.

During transfer of MC or SC from their respective storage reservoirs the feed reservoir must be vented. Venting prevents pressure from building up in the delivery line to the jet head as the air volume is decreased in the feed reservoir when the new SC or MC is transferred. A vent 86 can be tied in with the level detector 85 and be operated electrically. The actual transfer of material can be actuated by air pressure or by pumping. Pumping would have to be done with a completely non-intrusive/non-contact system such as a peristaltic pump.

The basic principle on which the material transfer system functions is siphoning. A fluid balance exists between the feed reservoirs 81 and the jet head reservoirs 70. In a typical system consisting of two reservoirs and a connecting delivery tube, when material is removed from one of the reservoirs, a matching amount of material flows via the delivery tube from the other reservoir to equalize the fluid level. This only works when both reservoirs are at the same atmospheric pressure.

When one of the reservoirs is sealed as in the jet head 60, the system operates a little differently. In the jet head reservoir 70 is the bubble 76. The jet head reservoir 70 is sealed air tight. As the fluid level is depleted inside the jet head reservoir a vacuum develops in the jet reservoir. As these forces increase, fluid flows via the heated delivery line into the jet head reservoir. The air bubble also acts as a stabilizer. Because of the bubble, relatively large fluid level changes can be tolerated. Any change in the fluid level of a feed reservoir would normally have an instantaneous hydraulic effect on the jet meniscus, but with the bubble system, the level changes in the feed reservoir can vary 40 mm without an adverse effect on the jet meniscus. As previously mentioned, the bubble also isolates the jet tip 61 from the hydraulic surges caused by the motions of the jet head carriage. Without the bubble it would be much more difficult to keep the jet functioning properly and consistently.

The MC and the SC are very different compounds. Their most important characteristic is that they both phase change at similar temperatures, but respond to completely different solvents. The solvent that is used to remove the SC has no effect on the MC and vice versa. This creates a very convenient handling environment, plus the solvents used are very common and environmentally safe.

Other differences in the modeling materials are in their density and surface tension. Because of these differences the functional fluid level of each material is different. Basically the MC (sulfonamide based material) fluid level in the feed reservoir is about 25 mm above the fluid level in the jet head reservoir. The fluid level in the SC (wax base material) feed reservoir is about 25 mm below the fluid level in the jet head reservoir.

FIG. 8 shows a feed reservoir 81 according to the second embodiment of the material supply system. As shown in FIG. 8, the feed reservoir 81 has an inlet nipple 87 and an outlet nipple 88 for the attachment of heated supply lines for the passage of MC and SC into and out of the reservoir 81. A thermistor 85 is used to detect when the level of MC or SC falls below the thermistor sending an appropriate signal to the control unit triggering the transfer of material from the storage reservoir 83 to the supply reservoir 81.

A vent portion 86 is located on top of supply reservoir 81 for selectively venting the reservoir 81 to prevent pressure from building up in the reservoir upsetting the syphon balance. A valve member 90 is selectively actuated by a solenoid 89 for selectively engaging and disengaging a valve seat 91, thereby opening and sealing a passageway 92 allowing air to pass into or out of the reservoir 81. It can be appreciated that any appropriate sensor may be used in place of a thermistor for sensing the level of the material within the supply reservoir 81. Likewise, valve 90 may be formed in any appropriate shape or style, such as a gate valve or ball valve, and may be actuated by any appropriate actuator, such as a pneumatic or hydraulic actuator or an electric motor.

Jet Checking and Cleaning

The jet checking and cleaning station 20 will now be described with referenced to FIG. 9. The jet checking and cleaning station 20 comprises a jet checking thermistor 100 disposed above a jet cleaning paper tape 101 which extends from a supply spool 102 through tape tension rollers 103 and a tape guide 104 to a capstan drive 105 driven by a drive motor 106. The capstan 105 drives the paper tape in the direction of arrow 107 by virtue of pressure applied against the capstan, with the tape therebetween, by an idler roller 108 which is spring biased towards the capstan 105 by a spring loaded arm 109. The jet 60 is shown located above the paper path in a jet cleaning location.

Upon the detection of a failure of one or more of the jets 60 to fire bead creating drops upon demand a jet checking and cleaning operation is undertaken at the jet checking and cleaning station. The failure may be a hard failure, if the 3-D model goes off line which will result in the alarm sounding, or soft failure when analysis of the jet electrical activation pulse indicates that no drop has been ejected from the jet. The detection of the latter type of failure will be described hereinafter with reference to FIGS. 10 and 11.

Upon detection of a failure the carriage 12 is moved to the jet checking and cleaning station where the failure is verified by an attempt to eject bead forming drops onto the thermistor 100. Analysis of the thermal circuit of the thermistor will indicate whether the jet is ejecting drops or not. If the jet is not ejecting drops, it is moved into position at a jet cleaning location immediately adjacent the upper side of the paper tape moving away from the capstan 105. At this location the jet is purged by operating an air pump for 5 seconds and it is then returned to the location of the thermistor 100 where the return of the jet to an operating condition ascertained by the thermal circuit associated with the thermistor or its continued failure is confirmed. If the return to operation is confirmed, the carriage is returned to its location over the platform 10 at which it can either commence building a model or, if the failure occurs during the building of a model which resulted in the jet being taken off-line, it can pick up precisely where it ceased operation. If the thermal circuit confirms that the jet is still failing to eject drops, the jet can be returned to the cleaning station above the paper tape for a further attempt at cleaning. If others of the jets 60 require cleaning they are moved into position while the tape is moved in a manner to prevent intra-jet contamination of MC and SC.

After the jet in question returns to operational condition and the test firing of between 1,000 and 3,000 drops is confirmed, the thermistor is switched from a jet testing mode to a burn mode in which the compound which has been ejected onto the thermistor is burned off in preparation for a future cleaning cycle. This switching to a burn mode may be left until immediately before the next cleaning cycle is required or desired.

Jet Failure Detection

Referring now to FIGS. 10 and 11, FIG. 10 illustrates a piezo activating pulse which is used to cause a drop of compound (MC or SC) be ejected by a jet 60. The pulse approximates a square-wave and terminates with ringing which is encompassed by a dashed circle in FIG. 10. FIG. 11 is an enlarged view of the ringing shown in FIG. 10. Each jet produces a ringing which constitutes a signature of that jet when it is operating normally and this normal signature is illustrated by the solid line in FIG. 11.

The signature of an operating jet can be analyzed and stored for comparison with subsequent ringing by that same jet upon the ejection of each drop by that jet. If the subsequent ringing as analyzed is within an appropriate tolerance from the stored information concerning that jet signature, the controller can confirm that the jet is operating properly. If, however, the signal differs significantly from the normal ringing signature, as shown with a dashed line, for example, in FIG. 11, the controller will determine that a jet failure has occurred, cease any current model building activity at the moment of failure and initiate the cleaning sequence. Once the jet is brought back on line and this is confirmed the model building can be started again by the controller at the precise location of the failure without detriment to the model being built.

Modeling and Support Compound

Turning now to the media, the wall and fill material are, at the present time, preferred to be one in the same, namely either.

Formula 1.

|  | Parts by weight |
|---|---|
| a) Ketjenflex 9S | 90 |
| b) Vitel 5833 | 10 |
| c) Ultranox 626 | 1 |
| or | |
| Formula 2. | |
| a) Ketjenflex 9S | 85 |
| b) Vitel 5833 | 10 |
| d) Iconol NP-100 | 5 |
| c) Ultranox 626 | 1 | where:
a) Ketjenflex 9S is 40/60 Blend ortho-Toluene Sulfonamide/para-Toluene Sulfonamide available from Akso Chemie - Chicago, IL
b) Vitel 5833 is Polyester resin available from Shell Chemical Company - Akron, OH
c) Ultronox 626 is Phosphite antioxidant available from G.E. Specialty Chemicals Inc. - Parkersburg, WV
d) Iconol NP-100 is Nonylphenol Ethoxylate available from BASF Performance Chemicals - Parsippany, NJ The Support media is preferably:

|  |  | Parts by weight |
|---|---|---|
| a) | Candelilla Wax Refined, light flakes | 65 |
| b) | CPH-380-N | 20 |
| c) | Ross Wax 100 | 10 |
| d) | Eastotac - H 130 or H 100 | 5 |
| e) | Irganox 1010 | 2 | where:
a) Candelilla Wax is low resin natural wax available from Frank B. Ross Co., Inc. - Jersey City, NJ
b) CPH-380-N is N,2-Hydroxyethyl Stearamide available from The C.P. Hall Company - Chicago, IL
c) Ross Wax 100 is Fischer-Tropsch Wax available from Frank B. Ross Co., Inc. - Jersey City, NJ
d) Eastotac is H 130 or H 100 - Hydrocarbon resin available from Eastman Chemical Products, Inc. - Kingsport, TN
e) Irganox 1010 is Hindered phenol antioxidant available from Ciba - Geigy Additives - Hawthorne, NY It is important that the above materials have the proper amount of self adhesion as well as adhesion between the build material and support material. The adhesion property is very important in minimizing problems of warpage and proper strength of the finished model. In addition the two materials must have the right properties for proper cutting during the cuts for Z dimension control. These properties are:

1. Materials must be hard enough to cut with slab miller without blade contamination.
2. Materials must have matched crystallization rates.
3. Materials must have similar melting points and thermal coefficients of expansion.
4. Materials must not be soluble in each other and further each must be capable of being dissolved in a solvent which the other material is insoluble and vice versa.

Bead Pitch Control

With appropriate inputs from existing hardware such as encoders 29, 30, appropriate software can perform the following functions.

1) Give firing signals to the jet(s) 60 so that a given quality vector (bead spacing) is produced regardless of the speed, angle, or curvature of the plot. The software and logic control spaces the beads so that specified end dimensions and surface finish are produced.

2) To control bead pitch, software will not move the jet(s) so that their vectored speed over the platform exceeds the maximum refire rate of the jets. There are two ways that the bead pitch can be set, i.e. using either software or hardware.

Currently, hardware adjusts the firing so that a uniform bead pitch is maintained independent of the variable speed, during starting and stopping, or the angle or curvature of the vector. In the case of vectors along the X or Y coordinates, the hardware fires beads every plurality of encoder 29, 30 ticks that matches the bead pitch specified during the acceleration or deceleration period. When the velocity of the vector production approaches (or is a constant speed) the bead firing may, in some cases, switch to firing on a time basis, instead of encoder ticks.

In the case of a diagonal or angled vector, the encoder 29 or 30 is used that represents the biggest incremental value (this indicates that the vector is not more than 45 degrees from the encoder axis used) and the number of encoder ticks will be shortened so that the specified bead pitch will be maintained. The encoders 29, 30 are present to detect movement along each of the x and y coordinates.

In the case of diagonal or curved lines, hardware adjust the bead pitch as measured from one of the encoders "on the fly" by the ratio of two measurements which are proportional Vx and Vy. The arc tangent of the instantaneous ratio or the sum of the squares gives the instantaneous angle of the curve or diagonal line. By using a lookup table, the number of encoder ticks between beads to maintain the desired dot spacing is determined.

The encoder is used that instantaneously has the higher velocity and an instantaneous angle of 0 to 45 degrees. At 45 degrees, switching from one encoder to the other occurs. During slow down for the end of an arc the correct length is maintained by adjusting the last bead pitch spacing.

To implement this desirable function the jets are fired by either the X axis or Y axis encoders 29, 30. The X coordinate encoder 29 is used for all lines within 45 degrees of the X coordinate direction 4 and the Y coordinate encoder 30 is used for angles greater than 45 degrees from the X coordinate direction 4. Thus the desired bead pitch is maintained accurately to the desired pitch regardless of vector direction, speed or curvature.

Typically a bead pitch of 0.025 mm can be achieved with a jet emitting a drop of about 0.09 mm diameter to provide a bead of about 0.12 mm diameter.

The hardware measures the instantaneous angle by measuring the number of encoder ticks, in a known short period of time, of the encoders 29, 30. By taking the ratio of these encoder ticks and using a look-up table, we can determine the number of encoder ticks between bead ejectors to obtain a uniform desired spacing between beads at any instantaneous line angle.

Beads are ejected from the jets by a counter that counts quadrature encoder ticks. The number of counts is adjusted for the instantaneous angle of the line.

There are other more complicated ways of ending the vector at the correct point. The vector length is not usually an even multiple of the bead pitch but usually has a remainder. In order to make the vector come out to an exact length, one of several other more complicated methods could be used:

1) Make "n" uniform beads where "n" equals the line length divided by bead pitch and make one more bead that has a spacing equal to "r", the remainder. "n" and "r" would ideally be supplied by the software, or if necessary, be calculated by the hardware. In most cases, this method is probably the most convenient method to use.

2) A theoretically better result is achieved by arranging for the hardware to increase the pitch of "r" beads so that the exact length is realized. While this method is a little better for straight lines, it is impossible to use in the case of curved lines.

3) Making a bead at the end of a line even though it is not the correct spacing. This causes a variation of the height of the wall at this point which with proper control can be an increase in height. This error in height is corrected when making a cut with the milling cutter as described later.

If, for example, drops ejected by the jets take about 270 microseconds to hit the media and make a bead after it is commanded to do so electrically. At 84 mm/sec jet speed, it takes almost 0.23 mm of translation for the drop to make a bead after it is fired. However, when we start a line and are standing still, we make a bead and then start accelerating, at say 4 Gs. We want to fire the next drop after moving, say 0.24 mm which occurs in 3.6 milliseconds, at which time we are moving at 142 mm/sec which puts the bead at 0.30 mm instead of 0.24 mm. We want the next drop at 0.48 mm, which occurs at 5.1 milliseconds and where the speed will be 200 mm/sec which puts the bead at 0.56 mm, a separation of 0.27 mm. We want the next drop at 0.76 mm, which occurs at 6.2 milliseconds and where the speed is 244 mm/sec which puts the bead at 0.83 mm, a separation of 0.27 mm. We want the next drop at 1 mm, which occurs at 7.2 millisecond and where the speed is 282 mm/sec which puts the bead at 1.1 mm, a separation of 0.26 mm. The separation keeps approaching 0.25 mm as the speed approaches 813 mm/sec where we may switch over to firing on time intervals. As we slow down, the dots tend to get closer together by a fraction of a mm instead of further apart.

With software control of bead spacing, we still use the encoder ticks to fire the print module on the acceleration and deceleration parts of the line. We use the encoder 29 or 30 that was closer in angle to the instantaneous angle to fire the jets. Since the controller 11 electronics always knows the instantaneous angle of the line being plotted, this can steer us to a look-up table to tell us the number of ticks to use for refire during this phase. When we refire with time during the constant speed phase, we do not need to use the lookup table.

An alternative to the above approach is as follows. A combination of software and hardware keeps track of encoder ticks. At every encoder tick in either the X or Y axes, it calculates the diagonal distance moved and the current velocity, allowing for the time of flight of the bead, the correct time is calculated for bead firing to get the correct dot spacing.

Model Building

Using the model maker 1 a three dimensional model is produced using a thermoset drop on demand ejector (jet 60) at a desired "drop pitch" to produce a vector outline of the inside and outside surfaces of a given layer. Preferably, said vector outline is repeated one or more times by off setting subsequent vectors from desired outlines depending on part geometry and build strategy (solid model or shell model). The amount of offset is referred to as "wall pitch". These parameters can be varied to produce a high quality surface 3-D model. Both wall pitch and drop pitch can also be varied to produce a layer thickness range of from about 0.03 mm to about 0.18 mm which will result in an operator selectable surface finish/build time trade off. Note: Drop pitch can be controlled as hereinbefore described. Wall pitch control is achieved via software as implemented by the controller 11. Head to tail vector plotting is an additional software control that is used to enhance surface quality.

The model is then produced one horizontal layer at a time using X-Y vector plotting techniques using the jets with the aforementioned bead pitch control. Z coordinate model control is discussed hereinafter under "Layer Growth Control".

While void filling has been discussed using MC ejected from a resonating jet 60 or from a dedicated larger orifice jet, other filling systems are contemplated. For example, voids could be filled by quick set foams (e.g. urethane) or other quick setting and/or quick application materials (e.g. waxes, powders, etc.)

An additional method of filling voids, at the completion of so many layers, but preferably before cutting particles, preferably round beads, at ambient temperature, are added to fill the void to the cutting level. These particles can be of the build material (MC) or could be of any other compatible material.

After filling, at least the upper surface of these particles are glued together by jetting beads from either the build material jet or even the support material jet, after cutting, the model building proceeds as before.

Model Mounting

One of the most significant is the mounting system for supporting the model on the platform 10 during modeling. Building a part and then being able to remove the part without damage or without secondary operations is an important goal. With the present system, this is done without any significant problems and parts are formed and built on a mounting system which yields a 3-D piece that has a functional surface as removed with no secondary operations needed.

The process begins, in a first embodiment, with a rigid and flat base plate. The material of the plate can be of any reasonably heat resistant material (typically 0.060 thick aluminum). The heat resistance must be at least 140 degrees celsius with no visible effects such as warpage, shrinkage or melting. The base plate is heated to approximately 120 degrees celsius and virgin MC compound is then applied to the plate and allowed to melt thoroughly. This puddle of MC is spread uniformly over the surface. At this point a piece of absorbent card stock is placed on top of the puddle and the MC is allowed to saturate the card. After the card has sit for a time sufficient to allow full saturation, a very small additional mount of MC is added to the top surface of the card. This additional MC is spread out as thin and as evenly as possible. Insuring that the card is fully saturated and lying completely flat on the plate, the plate assembly is then carefully removed from the heat source and allowed to cool to room temperature.

With the cooling comes adhesion. When completely cooled the card stock will be securely attached to the plate. The plate is then cleaned up and trimmed. Care must be taken not to touch or contaminate the top surface of the card. Any kind of oil especially finger prints will contaminate the top surface and prevent the MC being jetted from sticking.

The plate should be used as soon as possible. Surface oxidation and the continued possibility of contamination will make the plate unusable within a few hours.

The plate is attached firmly to the platform by double sided adhesive tape or clips with the top surface lying in the X-Y plane.

According to a second embodiment the card is replaced by a rigid polystyrene foam lamina attached to the plate by a styrene-toluene adhesive. The resulting laminate is firmly attached, as before, to the platform 10 and the upper surface is then milled by the slab milling cutter 25 to produce a flat surface in the X-Y plane. The model is then formed by the jets 60 on that flat surface to which the MC and SC adhere tenaciously.

Model Removal

After the model has been made using the first model mounting embodiment, it must be removed from the plate. Eventually there will be an apparatus to perform the following function. However, for now the process is a manual one. The removal process begins with a plate which has on it a fully formed model. The plate/model is placed on a hot plate set at 120 degrees celsius. It is critically important that the operator watches the plate temperature extremely closely. After the plate begins to warm up an attempt is made to raise one of the edges of the card stock. When the MC compound reaches about 80 degrees celsius it's shear and tensile strength diminishes significantly. When it first becomes easy to lift the edge of the card the MC is at approximately 80 degrees celsius.

At this point a shearing force is applied to the card stock. This force must be applied as parallel, to the plate, as possible. While the force is being applied, the card will suddenly release and slide off the plate. This occurs when the plate reaches approximately 105 degrees celsius. The card is immediately laid down on a very flat surface and allowed to cool. This surface must be as flat as possible in order to limit or eliminate the need for secondary annealing of the model. Since the model is very warm at this point it can be deformed easily. If the part is deformed slightly simply as a result of removal and if it has not been damaged in the process, annealing will, most likely, restore it to its original shape.

With the second model mounting embodiment, a simpler Model removal technique is used in which the styrene foam is dissolved off of the model by the use of the styrene solvent (toluene) the MC and SC both being unaffected by this solvent. The result is less potential model distortion and potentially a greatly reduced need for annealing.

Layer Growth Control

Z axis control is important in controlling part geometry. With drop volume and thickness variations from machine to machine, presently, the only practical method of controlling the Z axis is to mill the model at selected intervals. Within a given layer, geometric variations such as at intersections, and wall thickness variations contribute to creating a varying layer thickness. Although this may only amount to thousandths of a millimeter per layer, it soon accumulates. Slab milling the top surface after selected intervals guarantees that the vertical growth is under as accurate dimensional control as the X and Y axis.

Additionally, slab milling the top layer at selected intervals helps to relieve intra-layer stresses. Accumulated dot shrinkage is responsible for adding to the warpage control problems that will be discussed later. Milling these layers unbalances the stresses so that the stresses remaining actually work oppositely and cause those layers to tend to warp in the other direction. However, with the firm foundation that the layers are being built on these stresses do not cause problems. To maintain a precise Z-AXIS build, the model shaving system 24 is utilized after one or more layers (preferably five) of modeling compound have been laid down. When the controller 11 senses a "cut command" the rails 5 and carriage 12 assembly move to engage and "pick up" the shaving system via two electromagnets 31 and translate the milling cutter 25 across the model at software selectable cutting speed and feed, return the shaving system 24 to its home position, release the engagement and continue building the model. The milling cutter is coated with Polyond to facilitate release of shavings from the model for removal by sub-atmospheric pressure connected to output 28.

Warpage Control

Warpage is the single most difficult problem to overcome in producing high accuracy parts. The fundamental properties of the present system would support a severe warpage control problem. The basic material used to produce parts have themselves high shrink rates (18% to 22%) when compared to other materials. When a material has a different specific gravity in one form versus another such as liquid and solid, there will be noticeable shrinkage during phase changes. In our case we must deal with this problem as well as with the physical coefficient of thermal expansion that all solids have. When the parts are formed hot and are used cold there is always a problem with warpage.

To overcome the problems of shrinkage caused warpage, we avail ourselves of the special benefits of our process. The previous described condition describing our materials would apply if one was to cast a part with molten material into a mold. However, we form parts a drop (bead) at a time. In doing so, most of the material shrinkage occurs while the drop is enroute and as soon as the drop hits the building surface. Before the next liquid drop hits the surface and has a chance to completely flow into the previous drop it begins to shrink.

Controlling part geometry, material temperature, bead pitch, flight distance/time, wall pitch and building surface temperature together with layer milling can control the shrinkage to where it has minimum effect on the part to cause warpage. To achieve this, material temperature, flight distance/time, and building surface temperature become standard machine settings, while dot pitch, wall pitch, and layer milling are operational variables. Controlling these variables allows maximum influence on warpage and dimensional control.

Beyond all of these factors is still the problem of individual drop shrinkage and a major objective regardless of the approach is to control drop shrinkage. There must be enough fluidity left in the drop to assure coherence to the previous build but not enough to cause warpage.

Cross Hatching & Patterns

It is practically impossible to totally eliminate all shrinkage and warpage during building, but it is possible to control it within allowable tolerances. When warpage is still a problem, imaginative fill patterns begin to play an important role. Double crosshatching biaxially reinforces the section of the model to help eliminate anisotropic shrinkage. Uniformity in fill patterns enhances dimensional and shrinkage control. With fill wall pitch it is important to obtain maximum reinforcement with the least amount of material to keep up with the perimeter build. In some cases it may be necessary to alter the perimeter conditions in order to match the fill pattern build rate.

Typically, bead pitch is a settable parameter. In one shrinkage reduction technique, a drop is placed at a specific first bead location. Where the second drop would normally be placed there is a space. A second drop is then placed where the third bead belongs. This pattern is repeated for the complete layer. When the layer is completed with half of the required beads a single drop pitch shift occurs. The layer is then repeated. As a result, the drops of this repeated layer are placed in the spaces between the previous beads. Completing this shifted pattern completes the layer. This may be repeated throughout the part, or perhaps only where warpage or dimensional control is anticipated to be a problem. The advantage is that each drop has the opportunity to fully shrink without the influence of the other drops of that layer. The result is that now the vast majority of the shrinkage has already occurred and the object is effectively being built with pre-shrunk material. Minimized stresses which result have little or no effect on the layers.

Lattice Support Structures

Important to the successful building of some shell models are internal support patterns or lattices. These patterns allow building models with less then 100% density. Basically they consist of walls of varying thicknesses and pitches and running either unidirectional or bi-directionally. Orientation of the patterns should be carefully considered to ensure minimum warpage.

In some modes, their shape may pose warpage problems when using unidirectional patterns. This additional warpage comes as a result of polarizing stresses in one direction. In these cases, changing the support pattern orientation may decrease the warpage problems by redistributing the stresses. In any case the unidirectional pattern chosen continues throughout the part.

Bi-directional lattices consist of bi-directional walls in the same layer. This is particularly helpful with smaller aspect ratios that require the same reinforcement in all directions. In cases of larger aspect ratios there may be reasons to vary the pattern pitch from one direction to the other to further increase the control of warpage.

Basically the major reasons for lattice patterns are: 1. Density reduction. This has several direct benefits. First there is the obvious benefit of less material and therefore less expense. Second, there is reduced time required to build the model. With 40% less material a comparable solid model will take considerably more time to build. 2. Warpage control. While warpage is a relatively minor problem, the fill pattern options further reduce it to the point where secondary solutions such as annealing and fixturing should account for only single digit percentage of applications. 3. Reduction of strain of a wax pattern on the ceramic cavity during processing in an investment casting operation. 4. Model cooling is quicker.

There are several factors to consider when determining the type of lattice pattern for a model. 1. What is the minimum amount of material required for the model? Sometimes the model may have to be solid. 2. What is the anticipated warpage? 3. What is the desired outside wall finish? This must be considered in those cases where the wall type selections cause accelerated build rates. These cases require matching the build rates of the exterior walls with those of the lattice walls. 4. Is the part going to be closed off? Depending on the height of the part, this will determine the pattern pitch. The shallower the part, the closer the pattern pitch has to be.

Figure 12:
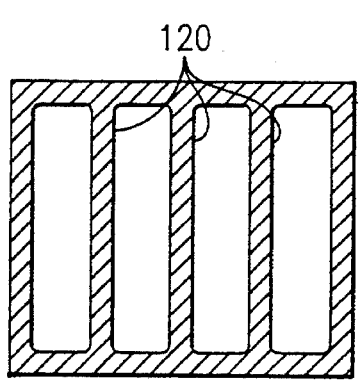
FIGS. 12 to 16 illustrate various lattice reinforcements for use with hollow models.
Figure 13:
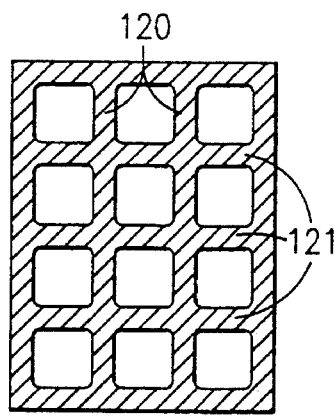
Figure 14:
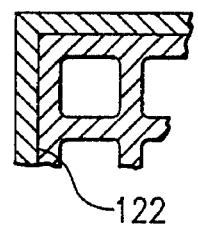
Figure 15:
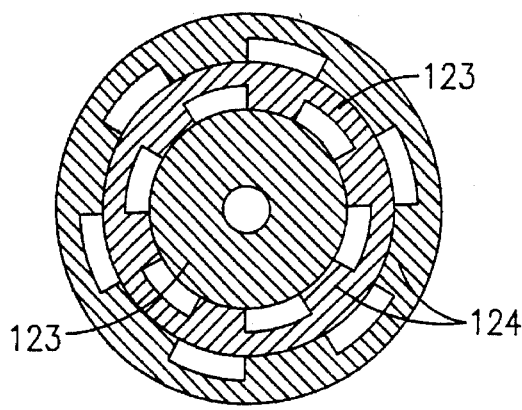
Figure 16:
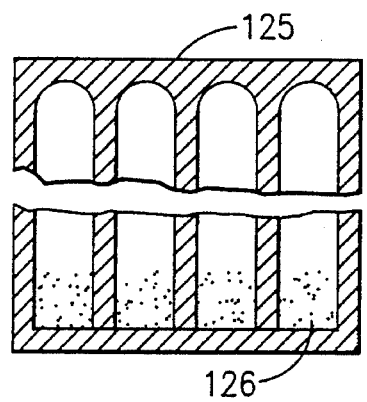

Structure lattice reinforcing arrangements such as have been described above are exemplified by FIGS. 12–16. In FIG. 12 a horizontal hollow cross-section of a square tower model is shown with unidirectional interior reinforcing walls 120 interconnecting a pair of opposite outer walls. FIG. 13 is a cross-section similar to that of FIG. 12 with bidirectional reinforcing walls 121. FIG. 14 illustrates a variation of FIG. 13 in which the bidirectional reinforcing walls terminate in an inner wall 122 of the model which is formed in each layer after the corresponding outer wall of that layer has been formed. By this arrangement undesirable stresses in the outer wall of the model, surface discontinuity or warpage thereof can be reduced or eliminated. FIG. 15 is a horizontal cross-section of a right cylindrical tower model with concentric inner reinforcing walls 123 spaced by ribs 124 to form a unitary structure. FIG. 16 illustrates a method of closing the top of a square tower model, such as illustrated in FIGS. 12 and 13, in which the top 125 of the tower is to be closed. In this arrangement when the model layers approach the closed top, drops are ejected over the entire area of the tower with the result that some of these drops form beads broadening the top of the reinforcing walls and some of the drops fall between the reinforcing walls to form beads at the bottom of the tower as shown as 126. As the layers are formed progressively toward the closed top, the width of the walls increases as additional beads are formed thereon until the space between the reinforcing walls is closed as shown in FIG. 16. The solid top can then be completed.

External Surface Finish Control

The jet head traverses in a computer controlled fashion to create 3 dimensional objects as earlier described by repetitively applying layers of (MC) varying or the same cross-section until the desired shape is obtained. In this manner, walls are constructed a droplet at a time at various spacings or dot pitch.

As the jet dispenses the MC droplets they land on a substrate and form 3 dimensional beads of a thickness slightly less than one half of their diameter after solidification. Depending upon the pitch, these drops can be deposited in an overlapping pattern. When new overlapping droplets hit the solid drops below, their momentum causes them to splatter slightly forward in the direction of printing. The resulting formation is similar to that which would be achieved by laying soft disks in a line with the disks overlapping each other. The degree of overlap can be 75% or more with each disk overlapping the previous one and dropping down to the layer below. After a significant number of layers have been laid down a roping or serpentine pattern can be detected in the wall when viewed from the side. The roping pattern may be undesirable in some applications and can be significantly diminished or totally eliminated by the addition of an immediately adjacent inner wall or walls. The actual number of walls will be determined by other factors (such as vertical build rate) in addition to the required finish. The wall thickness (or wall pitch) can be set to whatever is required.

The roping pattern appears primarily in single pitch walls, meaning a wall consisting of a single drop allowing the fluid droplet to wet the top of an interior wall when it splatters. Thus, the droplet wets inwardly as well as in the direction of building, reducing the volume of MC available for the roping pattern. The net result is a smoother exterior wall.

Interior lattice or fill patterns have a visible influence on exterior wall finish due to the thermal effect their ends have on the thin wall. With multiple thickness exterior walls this mass related phenomenon is reduced. As the exterior wall is made thicker, the ratio of lattice material and wall material is shifted in favor of the wall so that there is less lattice effect in the wall finish.

Wall intersections with lattices are determined by software algorithms so that whenever there is an intersection, the end of the lattice line is pulled back from the centerline of the wall by 50% of the lattice wall thickness Since the lattice walls and exterior single walls are the same construction the result is a 50% merging of material at each intersection. When building with multiple thickness exterior walls of the lattices interest only with the inner most wall. Therefore, latticing will effect the outside finish of a single thickness exterior wall more than a multi-thickness exterior wall which masks the lattice effect on exterior finish.

Corner Structure

A technique for forming outside and inside corners of the model's perimeter is very similar to the merging of material mentioned earlier when discussing the lattice walls intersecting with exterior walls. When turning corners with the jet, the MC material tends to accumulate at the corner. This accumulation is due in part to the fact that the material flow is being disrupted and the new adjacent wall allows the surface tension of the fluid to pull some of the material flow is being disrupted and the new adjacent wall allows the surface tension of the fluid to pull some of the material of both walls into the corner. Also, when the jet is at the intersection of two walls and MC is being jetted on the centerline of each wall there is some material overlap between the two walls and more material is deposited at the intersection than along the wall. Without correction, this phenomenon would gradually build the corners up vertically at a higher rate than along a straight wall.

This phenomenon can be compensated for by either stopping the end of the first wall a full wall thickness away from the adjacent wall or pulling both walls back 25%. In either case, the MC material flows into the space reducing the amount of material in the corner and diminishing the effect. At the same time, a corner is formed with a radii that is 50% of a single wall thickness.

Layer Cohesion

As droplets are laid down on top of the previous layer, there is a reflow phenomenon which acts to bond the new layer with the old layer. This reflow extends into the previous layer for only a small percentage of the layer thickness but is sufficient to accomplish several major things.

First, it enhance the bond between the new layer and the previous layer. Inter-layer cohesion assures an integral part when the model is finished.

Second, it relieves some of the stresses in the previous layer caused by shrinkage. The previous layer went through the same building technique as the new one goes through. When a layer solidifies it does so from the bottom up since the previous layer was already relatively cold. Because the top of the layer is not constrained and the bottom is, non-uniform shrinkage occurs, this difference in shrinkage caused stress in the layer. When the new layer is applied the reflow zone tends to relax much of the stress. By giving up the majority of its heat directly into the previous layer a degree of annealing is achieved. This mini-annealing process is repeated layer after layer.

Third, exterior part finish is improved. The minor melting of the cohesion/reflow zone also promotes a blending of layers at their union. This improves finish by virtue of reducing the depth of the junction at the merging of the droplet radii of the previous layer with the current layer in a fillet fashion.

Up to four layers seem, in tests, to be noticeably improved as to surface finish by reflowing of the cohesion zone of previous layers.

Annealing

If, after all these steps have been carried out, there is still stress and warpage that needs to be removed, one option left is annealing. Generally, annealing is a last resort. Provided the part has remained securely mounted to the mounting plate, annealing is generally not required. However, when annealing is required one of following procedures should be followed.

A decision must be made as to whether the annealing should be done before the part is removed from the mounting plate or after. This decision is based on the geometry of the part and the ability of the part to withstand its own weight when heated.

After the decision that annealing is necessary has been made the part with or without the mounting plate is placed in an oven that has been heated to 80 degrees celsius. This process requires very close monitoring. Also, the oven must be held very uniformly at an even temperature throughout. An air circulating oven is recommended. When the temperature returns to the set temperature of 80 degrees the part is exposed to the heat for a period of time depending on wall thickness. The heavier and thicker the part the longer it will take to anneal. Generally, a rule of thumb is that it takes 20 minutes minimum regardless of how small the part and 10 minutes extra for each 1 mm of wall thickness. When the prescribed time has elapsed and the part seems to be completely annealed, the oven is turned off and allowed to cool on its own uninterrupted. When the oven temperature reaches 30 degrees celsius the part is safe to remove. However, the cool down rate should not exceed 2 to 3 degrees per minute. If it does there is a risk of reintroduced stress.

Alternatively, with the mounting plate still attached the model can be allowed to soak inverted in an annealing bath (e.g. of kerosene) at 40° to 50° C. The temperature is raised at a slow rate (e.g. 1° C./minute to ≈70° C.) where it soaks for ≈15 to 20 minutes. The base must remain cool to prevent separation and this may be achieved by a cold water or ice bath placed on top of the base.

In unusual situations there may be a need for specialized fixturing. When this is called for the same guidelines as outlined above are used. The only exception is that the fixture must be at room temperature when the part is mounted and more time must be allocated for the heat up and the cool down cycles. Thermal probes are also recommended for the fixture.

Powder Supported Model Maker Apparatus

Figure 18:
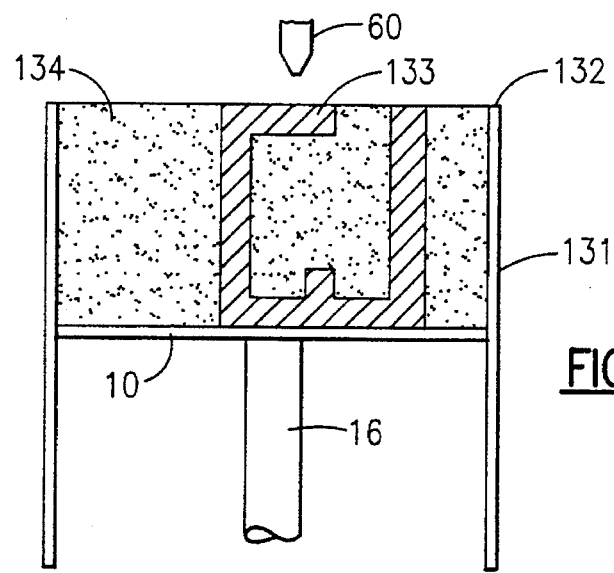
FIG. 18 is a diagrammatic cross-sectional elevation of a portion of the further embodiment of FIG. 17.
Figure 17:
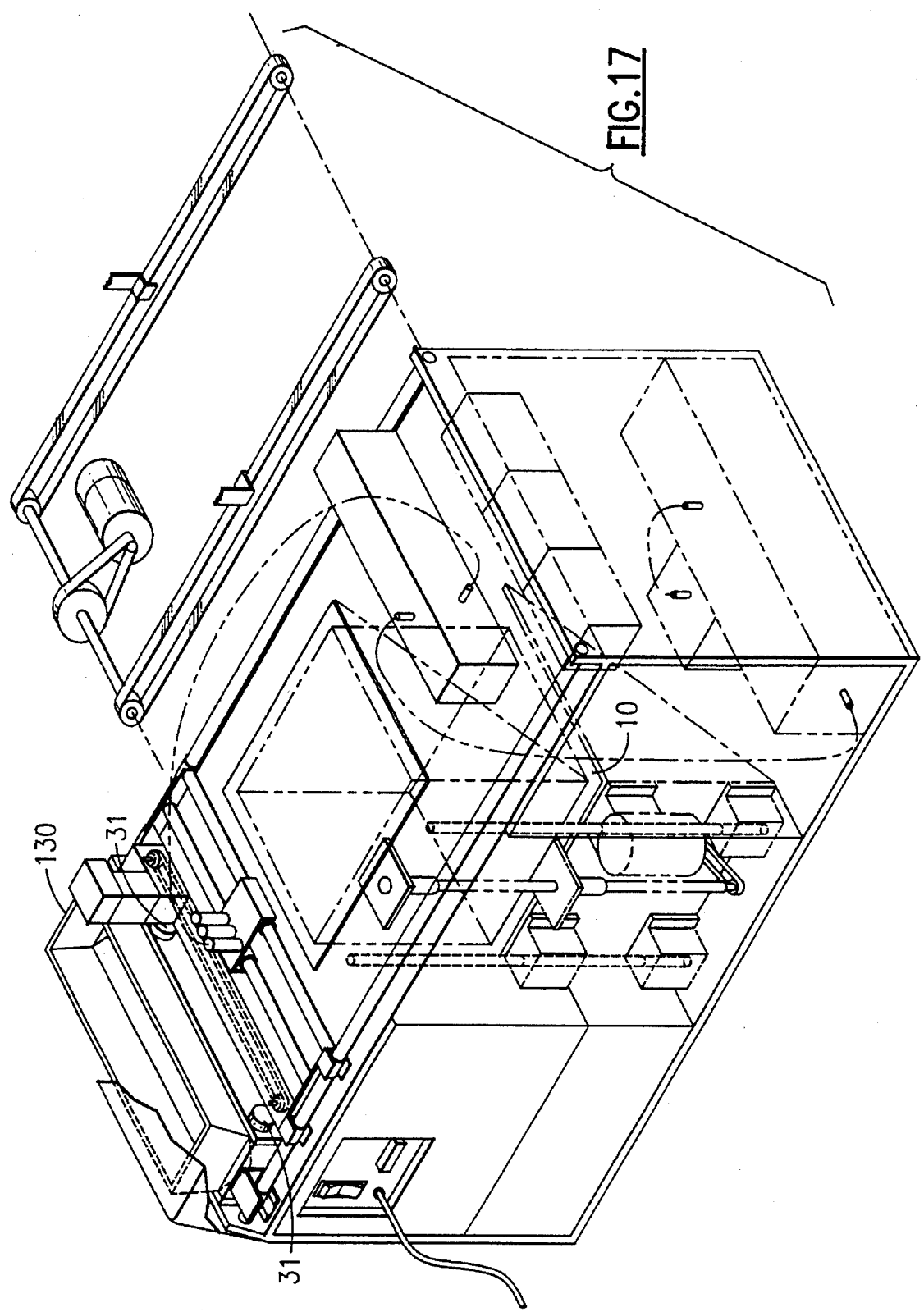
FIG. 17 is a diagrammatic isometric view of a three jet, 3-D Model Maker of a further embodiment of the invention.

Referring now to FIGS. 17 and 18 a further embodiment of the model maker of the present invention is disclosed in which the model is manufactured from a combination of beads of MC and layers of fine powder which may also, preferably, be MC. In FIG. 17 elements which are substantially the same as those described with reference to FIG. 1 will not again be described. In this embodiment, the model shaving system is replaced by a powder distribution hopper system 130 movable in the same manner as the shaving system for movement in the X coordinate direction, when required, by means of electromagnets 31 in a similar manner to the operation of the shaving system of FIG. 1 for the purpose of translating the powder distribution hopper system 130 along the X coordinate axis to lay down a layer of powder (preferably MC) upon the area of the platform 10. In this case, referring to FIG. 18, the platform moves up and down inside a tubular powder containment tube 131, the upper surface 132 of which defines the top surface of the layer about to be or currently being formed by the deposition of beads from a jet 60. Upon completion of the formation of each layer of the model, the platform is lowered in the Z coordinate direction a distance that will constitute the Z coordinate dimension of the next layer to be formed. Thus, the upper surface 132 and the formed layer of powder constitutes a flat planar surface lying in the X and Y coordinate directions.

The MC powder in this embodiment serves not only to increase the rate of which models can be produced but also serves as a support medium for cantilevered or overhanging portions of models such as shown at 133. MC powder in closed voids of a model can remain there while the MC powder surrounding exposed exterior surfaces of the model will fall away leaving a finished model as it is removed from the apparatus.

The MC powder is preferably deposited by the powder distribution hopper system 130 in solid form just below the temperature at which a phase change to a molten material will take place (glass transition temperature). This temperature is maintained, in at least the layer of the model which is being formed, by the heating of the containment tube or by the direct or indirect heating of the MC powder itself, for example, by utilization of an infrared heating hood above the apparatus.

In this system, bead forming drops ejected by the jet 60 penetrate the warm powder 134 under gravity and capillary forces to adequately bond the powdered particles together without the requirement of melting the particles and to bond the particles of the powder to previously fused layer portions. It is desirable to fuse the powder particles together and to the previously fused layer with a minimum melting of the particles themselves to minimize shrinkage and to reduce thermal energy input and thermal stresses. It should be emphasized that there should be enough thermal energy in the drops being supplied to fuse the powder particles to the previous layers.

In this embodiment sufficiently fine particles of the powder are spread by the distribution system to a uniform thickness determined by the step size of the platform in the Z coordinate direction. The particles are preferably made of the same material as that contained in the model compound jets 60.

By comparison with previously attempted laser fusing techniques utilizing powder material, the embodiment here described results in lower thermal stresses and shrinkages due to a) use of drop on demand jets of MC which have the effect of localizing thermal effects as opposed to the continuous melting process with which a laser is involved and b) 50% of the material (powder) does not have to actually melt but will reside in a matrix resulting in a lower shrinkage rate. A further advantage is the provision of higher material build rates. In model building in which bead forming drops are used to form the entirety of the model, the production rate is limited by the material delivery system and the cooling rate of the beads being formed. As a result, utilizing the powder technique of the second embodiment of the invention can easily result in a build rate in excess of at least two times the powder system of the first embodiment where the model ultimately consists of 50% powder and 50% bead forming drops of MC.

Substantially improved surface finish relative to the laser fused powder systems is achieved as the surface finish is not strictly limited to powder particle size in view of the effect of capillary forces attempting to pull the particles into a sphere and the smoothing of the particle irregularities by either encapsulation or wetting. In fact, any powder can be used to make suitable thermal characteristics and the choice of material could lead to delivery optimization, possible reuse of powder (recycling) and the use of low cost powders with optimum strength characteristics.

Although FIG. 17 illustrates a three jet apparatus, one or two jet arrangements are practical. In a one jet arrangement, MC would be ejected under control for model wall building and in resonant operation for filling or developing support surfaces. In the two jet arrangement, one jet would be for wall building and the other jet would be for filling or developing support surfaces.

We claim:

1. A 3-D model maker for producing a 3-D model by sequentially forming layer upon layer, by plotting vectors of modeling material, one layer at a time comprising:
   a) a support means defining a surface for supporting the 3-D model during production;
   b) a drop on demand jet means for ejecting bead producing drops of molten modeling material one drop at a time upon demand to meld with previously deposited beads, thereby to plot vectors of modeling material defining the layers;
   c) mounting means mounting the jet means i) for simultaneous movement along at least two axes of an X, Y, Z axis coordinate system relative to said surface to move the jet means along any desired vector direction while said jet means plots said vectors of modeling material on said surface and ii) for movement of the jet means, when desired, along all three of the X, Y, Z axes of the system, relative to said surface; and
   d) control means i) for providing vector plotting control of movement of the mounting means to move the jet means simultaneously along the at least two axes of the X, Y, Z axis coordinate system, ii) for controlling the timing of the ejection of bead producing drops of molten modeling material by the jet means to overlap previously deposited beads to a desired extent and to meld with previously deposited beads to generate vectors of modeling material, defined by the beads, in any and all directions required to produce, layer by layer by vector plotting, at least the other surface defining walls of the model being formed with a desired surface quality, and iii) for providing model fill and support control of deposition of at least one of molten modeling material, a molten fill and support material, and a powder fill and support material, to produce at least one of support for cantilever portions and other overhanging portions of the model during production and filling interior spaces of the model by at least one of vector plotting, raster scanning, spraying and deposition.

2. A 3-D model maker according to claim 1 wherein:
   a) the surface is flat and extends normal to the Z coordinate;
   b) the mounting means is for simultaneous movement of the jet means relative to the surface along the X and Y coordinates to define the vectors in any desired direction to form a layer; and
   c) the control means controls the mounting means for movement of the jet means relative to the surface along the Z coordinate after formation of a layer and prior to formation of a next subsequent layer.

3. A 3-D model maker according to claim 2 comprising a model shaving system moveable to shave the model to a desired height along the Z coordinate when desired; and
   coupling means for selectively coupling said shaving system to said mounting means for movement thereby, under control of the control means, when shaving is desired and uncoupling said shaving system from said mounting means when shaving is not desired.

4. A 3-D model maker according to claim 3 wherein said coupling means comprises electromagnets located on at least one of said mounting means and said shaving system.

5. A 3-D model maker according to claim 1 further comprising a responsive means for responding to vector plotting speed, acceleration and direction for controlling bead drop rate of said jet means to provide a constant bead pitch while said jet means moves along a vector during speed and direction changes of said vector, thereby providing a wall of modeling material having a substantially constant width and having sides with a desired surface quality regardless of speed, acceleration, angle or curvature of said vector.

6. A 3-D model maker according to claim 5 wherein said responsive means provides the control on the basis of vector plotting speed and direction during acceleration of the jet means and on the basis of time when jet means speed is substantially constant.

7. A 3-D model maker according to claim 5 wherein said vector plotting speed and direction are detected by X and Y coordinate encoders and the responsive means receives and responds to outputs of these, the direction of plot being determined continually by calculating one of the arc tangent and the sum of the squares of the instantaneous ratio of encoder outputs.

8. A 3-D model maker according to claim 7 wherein constant bead pitch is achieved by controlling the responsive means to fire said jet means, in response to the X and Y coordinate encoder that is closer in angle to said calculated direction, in dependence upon that angle.

9. A 3-D model maker according to claim 1 wherein the jet means comprises:
   a) a jet tip assembly defining an orifice for ejecting bead forming drops of molten modeling material;
   b) a jet reservoir for storing molten modeling material for supply to said orifice;
   c) an actuator for ejecting a drop on demand from the orifice;
   d) a capillary tube connecting the jet tip and the jet reservoir to counterbalance head pressure applied by the molten material in the jet reservoir to allow vertically downward ejection of drops by the jet means during operation thereof without dripping when the jet means is idle.

10. A 3-D model maker according to claim 9 wherein:
    the jet reservoir defines a space above the molten material to act as an isolator from hydraulic surges otherwise occurring as the means is moved while forming a layer.

11. A 3-D model maker according to claim 10 wherein the changes in pressure in the space as the level of the molten material in the jet reservoir falls siphons molten material from a supply reservoir to replenish the jet reservoir.

12. A 3-D model maker according to claim 11 wherein:
   a) the supply reservoir is located relative to the jet means to provide a desired head of molten material relative to the molten material in the jet reservoir to facilitate the replenishment;
   b) the supply reservoir has a molten material surface level detector; and
   c) a molten material storage reservoir is provided with supply means responsive to the surface level detector for maintaining the surface level in the supply reservoir substantially constant.

13. A 3-D model maker according to claim 10 wherein the space is formed by a phase change of the modeling material in the jet reservoir from solid to molten, the jet means being provided with a heater to cause the phase change and to maintain the molten condition of the material during modeling.

14. A 3-D model maker according to claim 10 wherein the space is maintained relatively constant upon removal and replacement of a jet reservoir closure cap by the provision of space vent openings located to be opened by the cap immediately upon movement of the cap at the commencement of cap removal and to be closed by the cap immediately before full replacement of the cap during cap replacement.

15. A 3-D model maker according to claim 9 wherein the actuator is a piezo actuator to produce, upon energization, an acoustic energy wave in and volumetric constriction of the molten material in the jet means between the orifice and the jet reservoir thereby to cause the ejection of a bead forming drop of the molten material from the orifice.

16. A 3-D model maker according to claim 1 comprising:
   a) an automated jet cleaning station; and
   b) a jet failure detection means for detecting failure of the jet means by detecting a variation in a ringing of an end of a jet means actuating pulse exceeding variations in the ringing when the jet means is functioning properly, wherein
   c) the control means responds to a detected jet means failure by taking the jet means off line and to the jet cleaning station and, upon rectification of the failure, to return the jet to the point of failure to recommence modeling from the point of failure.

17. A 3-D model maker according to claim 16 wherein the cleaning station comprises:
   a) a thermistor operative and positioned relative to the direction of drop ejection by a jet means to confirm failure of the jet means; and
   b) a cleaning device for purging a failed jet means upon confirmation of failure.

18. A 3-D model maker according to claim 16 wherein the failure detection means comprises:
   means for establishing and storing in the control means a signature profile signal which corresponds to the ringing of the end of a jet means actuating pulse when the jet means is operating properly;
   means for comparing the current ringing profile of the end of subsequent such pulses with the signature ringing profile;
   and means for generating a jet means failure indicating signal upon detection of a current ringing profile differing from the signature ringing profile by more than normal variations in the ringing profile of that jet means when operating properly.

19. A 3-D model maker according to claim 1 wherein the control means controls the mounting means to move the jet means relative to the surface always in vector motion at least to separately produce more than one wall element to define a wall of the model in each layer, thereby to enhance exposed surface finish.

20. A 3-D model maker according to claim 1 wherein the surface is constructed to firmly engage the first to be generated layer of modeling material and to permit release of that layer when desired by one of a) heating the layer to a release temperature and b) dissolving the material defining the surface.

21. A 3-D model maker according to claim 1 wherein, in order to minimize shrinkage and warpage, the control means causes the beads defining the vectors of a model layer to be formed in two passes:
   a) during a first pass of the jet means relative to the surface, each alternate bead of the desired vectors are formed; and
   b) during a second pass of the jet means relative to the surface, the missing intermediate beads are formed.

22. A 3-d model maker according to claim 1 wherein there are at least two jet means, a first for ejecting a molten modeling compound (MC) for building the structure of the model and a second for ejecting a molten support compound (SC) for depositing removable material to support cantilevers and other overhanging features of a model during production thereof.

23. A 3-D model maker according to claim 22 wherein there are three jet means, a third for ejecting one of molten modeling compound and molten filling material in larger quantities per drop than the first jet means, whereby the first jet means may be used to build exposed walls of the finished model using vector plotting and the third jet means may be used to quickly fill voids in the model which require filling using raster plotting.

24. A 3-D model maker according to claim 1 wherein the control means causes lattice reinforcing webs to be deposited layer upon layer to reinforce walls of hollow models.

25. A 3-D model maker according to claim 24 wherein the control means causes the webs to be formed of a plurality of unidirectional walls oriented to provide desired reinforcement.

26. A 3-D model maker according to claim 24 wherein the control means causes the webs to be formed of a plurality of bi-directional walls.

27. A 3-D model maker according to claim 24 wherein the control means Causes the webs to form an interconnecting inner wall structure that is intimately connected with an outer wall structure formed during the formation of the same layer.

28. A 3-D model maker according to claim 24 wherein adjacent a closed top model feature the control means causes molten material used to construct the webs to be deposited over the entirety of the closed top feature whereby the webs increase in thickness layer by layer until they meet to provide a continuous basis for the deposition of the closed top feature.

29. A 3-D model maker according to claim 1 comprising a model shaving system moveable to shave the model to a desired height along the Z coordinate when desired; and
   coupling means for selectively coupling said shaving system to said mounting means for movement thereby, under control of the control means, when shaving is desired, and uncoupling said shaving system from said mounting means when shaving is not desired.

30. A 3-D model maker according to claim 29 wherein said coupling means comprises electromagnets located on at least one of said mounting means and said shaving system.

31. A method of producing a 3-D model comprising the steps of:
   a) providing a surface for supporting the 3-D model during production;
   b) providing a drop on demand jet means mounted on a mounting means for simultaneous movement along X and Y coordinates, of an X, Y, Z coordinate system, parallel to the support surface;
   c) providing a control means for i) controlling the timing of ejection of bead producing drops of modeling material one drop at a time, upon demand from the drop on demand jet means onto the support surface to overlap previously deposited beads to a desired extent and meld with previously deposited beads, thereby to produce vectors of modeling material, at least when forming Outer surface defining walls of the model, thereby forming outer surface defining walls having a desired surface finish, ii) controlling movement of the mounting means and support surface relative to each other in the X and Y coordinates simultaneously to generate vectors of modeling material in any and all directions required to produce a layer of the model by vector plotting at least when forming outer surface defining walls of the model, thereby forming outer surface defining walls having a desired surface finish, and iii) for providing model fill and support control of deposition of at least one of molten modeling material, a molten fill and support material, and a powder fill and support material, to produce at least one of support for cantilever portions and other overhanging portions of the model during production and filling interior spaces of the model by at least one of vector plotting, raster scanning, spraying and deposition;
   d) moving the mounting means and the support surface relative to each other in the Z coordinate direction normal to the support surface under the control of the control means; and
   e) repeating steps b), c) and d), as required to produce desired additional layer(s) until the model is complete.

32. A method according to claim 31 wherein a desired void in the model is filled with solid particles of filler material compatible with the modeling material, whereafter at least an upper surface of the solid particles, in the void, are adhered together by modeling material ejected from the drop on demand jet means.

33. A method according to claim 31 wherein the support surface is styrofoam.

34. A method of producing a 3-D model according to claim 31 comprising the step of controlling bead drop rate of said jet means, at least when forming exposed walls of the model when finished, in response to vector plotting speed, acceleration and direction to provide a constant bead pitch while said jet means moves along a vector, regardless of speed, acceleration, angle or curvature of said vector and thereby provide said walls of modeling material having a substantially constant width and having sides with a desired surface quality regardless of speed, acceleration, angle or curvature of said vector.

35. A method of producing a 3-D model according to claim 34 comprising the step of controlling said bead drop rate on the basis of vector plotting speed and direction during acceleration of the jet means and on the basis of time when jet means speed is substantially constant.

36. A method of producing a 3-D model according to claim 34 comprising the steps of:
   detecting vector plotting speed and direction of the jet means with X and Y coordinate encoders and controlling the bead drop rate in response to output of the encoders; and
   continually determining the direction of plot by calculating one of the arc tangent and the sum of the squares of the instantaneous ratio of encoder outputs.

37. A method of producing a 3-D model according to claim 36 controlling the bead drop rate in response to the X and Y coordinate encoder that is closer in angle to said calculated direction, in dependence upon that angle, to maintain a constant bead pitch.

38. A method of producing a 3-D model according to claim 31 comprising the step of shaving the model to a desired height along the Z coordinate when desired by:
   a) halting ejection of bead producing drops from the jet means;
   b) moving the mounting means to a shaving means rest position;
   c) coupling the mounting means to a shaving means, parked in the rest position, for moving the shaving means with the mounting means and shaving the model to a desired height along the Z coordinate;
   d) moving the mounting means to the rest position upon completion of shaving and uncoupling the shaving means from the jet means, thereby parking the shaving means in the rest position; and
   e) resuming ejection of bead producing drops from the jet means, with the shaving means parked in the rest position, to produce additional layers if desired.

39. A method of producing a 3-D model according to claim 38 comprising the step of providing electromagnets on at least one of said mounting means and said shaving and energizing these electromagnets for the selectively coupling of said shaving system to the mounting means.

40. A method of producing a 3-D model according to claim 31 comprising the step of ejecting the bead producing drops of material at a temperature high enough to ensure that the beads of modeling material are still at least partially molten when the beads impact previously deposited beads, at least when forming one of an interior and outer wall of a model, to fuse the beads to and blend into the previously deposited beads thereby to enhance the surface finish of the wall.

41. A method of producing a 3-D model according to claim 40 comprising the step of ejecting the bead producing drops of material such that a new bead at least partially overlaps a previously deposited bead in the same layer thereby to enhance the surface finish of the wall.

42. A method of producing a 3-D model according to claim 41 comprising the step of moving the jet means to form a double wall of said overlapping beads, at least when forming exposed walls of the model, thereby to enhance the surface finish of the wall.

43. A method of producing a 3-D model according to claim 31 comprising the step of filling interior portions of the model with a powder material and adhering at least an upper surface of particles of the powder material together by ejecting drops modeling material from the drop on demand jet means onto the upper surface of the particles.

44. A method of producing a 3-D model according to claim 31 comprising the steps of:

a) forming outer and interior exposed walls of the model by firing the drop on demand jet means at a control frequency at which beads of modeling material of a substantially consistent size are ejected from the jet means;

b) filling interior portions of the model using raster scanning and by firing the jet means at a frequency, higher than the control frequency, that coincides with a resonant frequency of the jet means, thereby ejecting beads from the jet means that are substantially larger than beads ejected from the jet means at the control frequency thereby to increase rate of deposition of modeling material when filling the interior portions relative to rate of deposition of modeling material at the control frequency.

* * * * *